United States Patent [19]

Lange

[11] Patent Number: 4,462,631
[45] Date of Patent: Jul. 31, 1984

[54] EXPANDABLE VAN TOP TENT ASSEMBLY
[75] Inventor: Jack Lange, Winnipeg, Canada
[73] Assignee: Expandable Van Tops Ltd., Winnipeg, Canada
[21] Appl. No.: 361,442
[22] Filed: Mar. 24, 1982
[51] Int. Cl.³ .............................................. B60P 3/32
[52] U.S. Cl. ................................... 296/160; 296/161; 296/172; 296/26; 135/88
[58] Field of Search .............. 296/160, 161, 166, 172, 296/176, 26; 135/88

[56] References Cited

U.S. PATENT DOCUMENTS

| | | | |
|---|---|---|---|
| 2,513,411 | 7/1950 | Heil | 296/161 |
| 3,489,452 | 1/1970 | Plante | 296/27 |
| 4,055,366 | 10/1977 | Lee | 296/26 |
| 4,099,534 | 7/1978 | Corbin | 296/161 |

FOREIGN PATENT DOCUMENTS

| | | | |
|---|---|---|---|
| 514400 | 10/1952 | Belgium | 296/161 |
| 2910438 | 9/1980 | Fed. Rep. of Germany . | |
| 1058089 | 2/1967 | United Kingdom . | |
| 1194840 | 6/1970 | United Kingdom . | |
| 1478631 | 7/1977 | United Kingdom | 296/161 |

Primary Examiner—Robert R. Song
Attorney, Agent, or Firm—Stanley G. Ade

[57] ABSTRACT

The top of the van includes a perimetrical wall defining an opening with a hinged cover panel which opens to a horizontal position on one side of the van. A tent or enclosure is secured by the edges, around the perimetrical wall of the opening and around the free edges of the cover panel. A plurality of hoop braces are hinged to the wall and to the cover panel and the flexible enclosure is secured to these hoops so that the hoops are erected when the cover panel is opened. The cover panel is supported horizontally in the opened position by means of tension cables extending from the other edge of the opening, to the hoop braces to which it is secured, and is then secured to the distal edge of the cover panel by the other end thereof thus eliminating any need for vertical supports. If desired, a flexible porch can be detachably secured around the three edges of the cover panel when open, and can depend therefrom to the ground. Access to the upper tent portion is from the interior of the van through the opening in the roof thereof uncovered when the cover panel is open.

38 Claims, 11 Drawing Figures

EXPANDABLE VAN TOP TENT ASSEMBLY

BACKGROUND OF THE INVENTION

This invention relates to new and useful improvements in expandable van top tent assemblies. It can also be used upon truck campers or the like. Tent assemblies exist which extend from the sides of the van and also which can be erected upon the upper surface of a van, truck camper or car. However, these require extensive alterations and/or extensive storage space and are generally unsatisfactory.

SUMMARY OF THE INVENTION

The present invention overcomes these disadvantages by providing a relatively simple enclosure which is secured to and is opened by a hinged cover panel formed within the roof of the van. When the cover panel is in the open position, a screened porch may readily be detachably secured to the free edges of the cover panel and may depend downwardly therefrom to the ground surface.

In accordance with the invention there is provided in a van or other vehicle which includes a body having sides, ends and a roof and having a substantially rectangular opening within said roof defined by a pair of spaced and parallel longitudinally extending edges and a pair of spaced and parallel transverse edges; the improvement comprising in combination a cover panel hinged by one side thereof to one side edge of the roof defining the opening therein and movable between a closed position covering the opening to an open position extending substantially horizontally from the one side edge of the roof and vice-versa, a flexible enclosure secured by the lower edges thereof to the other edges of the roof defining the opening and to the free sides of the cover panel, a plurality of substantially U-shaped hoop braces hinged by the ends thereof to the transverse edges defining the opening within the roof and to the transverse edges of the cover panel, means to secure said enclosure to said hoops whereby, when said cover panel is opened, said hoops are erected by said enclosure, means to detachably latch said cover panel in the closed position and means supporting said cover panel in the open, horizontal position.

Another advantage of the invention is that access to the enclosure is from the interior of the van rather than from the exterior thereof.

A further advantage of the invention is that the cover panel is supported in the horizontal open position by means of tensioning cables thereby eliminating the necessity for vertical supports, tent poles and the like.

A yet further advantage of the invention is to provide a device of the character herewithin described which, when folded and the cover panel closed, is stored between the roof edges and the cover panel.

A still further advantage of the invention is to provide a device of the character herewithin described which is simple in construction, economical in manufacture and which is readily fitted to existing van structures and is extremely suited for the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 8 is an end view of FIG. 4.

In the drawings like characters of reference indicate corresponding parts in the different figures.

DETAILED DESCRIPTION

Figure 3:
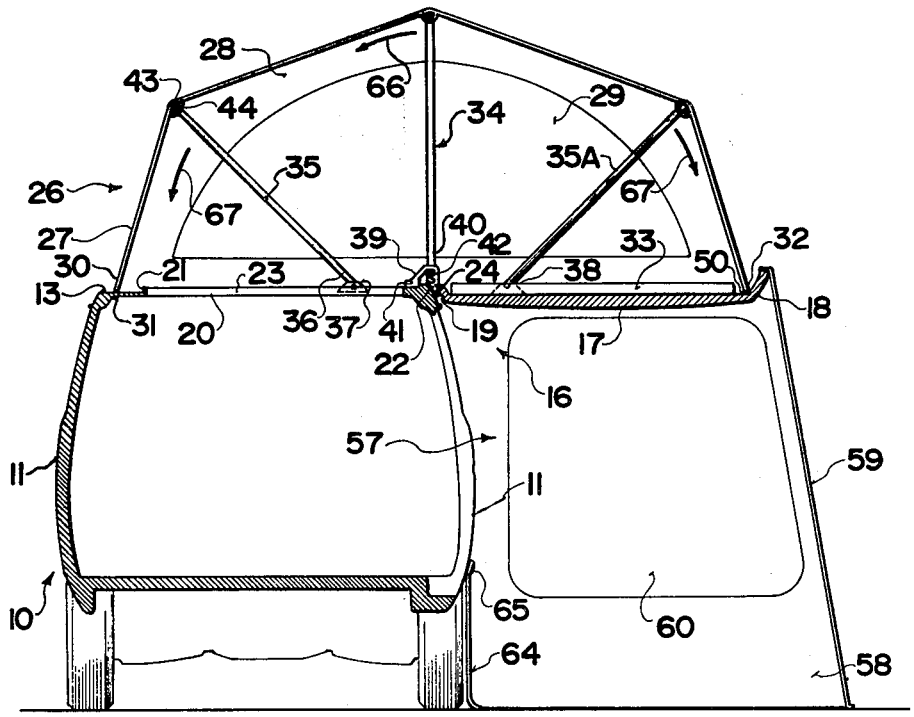
FIG. 3 is a partially schematic cross sectional view of FIG. 2.
Figure 3A:
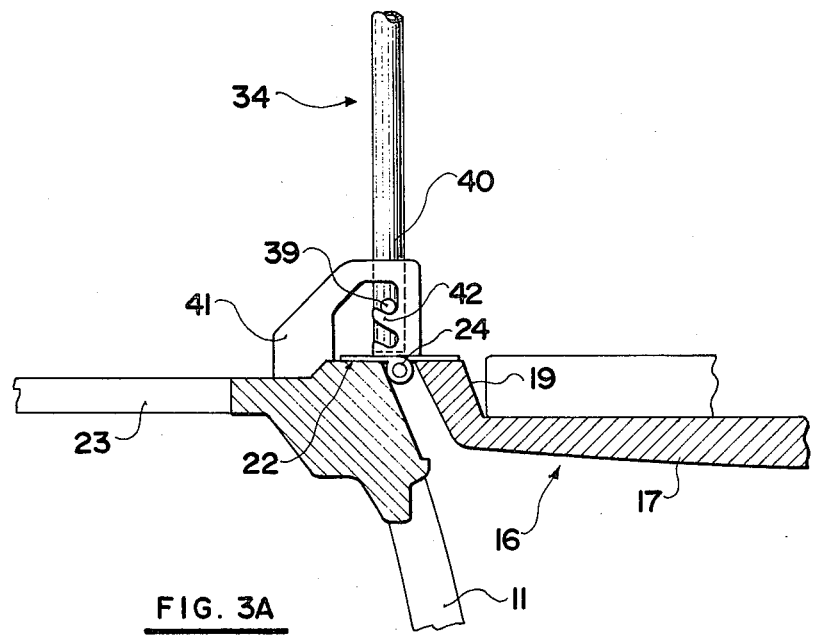
FIG. 3A is a fragmentary enlarged view of the detent assembly for the main hoop brace.

Proceeding therefore to describe the invention in detail, reference to the drawings will show a conventional van collectively designated 10 having sides 11 and rear wall 12 which normally contains doors (not illustrated), and a roof 13. The roof includes the upwardly extending sides 14 and the top panel 15. The present invention constitutes an improvement to existing vans by providing a portion of the roof collectively designated 16 in the form of a cover panel having a substantially planar portion 17, a downturned outer, longitudinally extending flange or wall 18 and a downturned, longitudinally extending inner flange 19. A substantially rectangular opening 20 is formed within the roof and defined by spaced and parallel longitudinal edges 21 and 22 and spaced and parallel transverse edges 23, one of which only is shown in FIG. 3.

The cover panel 16 is hinged by the edge 19 to the longitudinal edge 22 defining the opening 20 with reference character 24 illustrating the hinge. This enables the cover panel to be moved between the open position shown in FIG. 3 and the closed position shown in FIG. 1 with conventional latches 25 detachably securing the cover panel to the longitudinal edge 21 and to overlap these vertical edges to assist in the sealing relationship, conventional sealing strips (not illustrated) being provided.

A flexible enclosure is provided collectively designated 26 including side panel 27 and end panels 28 sewn together to form the enclosure and being provided with mesh screens 29 in the end panels, if desired. The side or main panel 27 is secured by edge 30 thereof to outboard of the longitudinal edge 21 by conventional means such as nut and bolt assemblies 31 and by the other edge 32 thereof to the inside of the cover panel adjacent the junction between the flange 18 thereof by similar means. The end panels are secured by similar means (not illustrated) inboard of the transverse flanges 23 defining the opening and inboard of the transverse flanges 33 of the cover panel.

A plurality of substantially U-shaped hoop braces are provided including a main hoop brace 34 and subsidiary hoop braces 35. One subsidiary hoop brace 35 is pivotally secured by the distal ends 36 thereof to brackets 37 adjacent the side flanges 23 of the opening and the other subsidiary brace 35A is pivotally secured by the ends thereof to brackets 38 adjacent the side flanges 33 of the cover, as clearly illustrated in FIG. 3.

The main hoop brace 34 includes pins 39 extending outwardly from adjacent the ends 40 thereof and these pins each engages an apertured bracket 41 which is secured to adjacent each end of the inner flange 22 defining the opening 20. These apertured brackets include a detent 42 so that when the cover panel is opened to the position shown in FIG. 3, the main hoop brace may be elevated manually and the pins hooked into the detents 42 in order to tension the enclosure 26.

The transverse main portions 43 of the hoop braces 34 and 35 engage pocket sleeves 44 sewn to the interior of the main enclosure panel 27 so that when the cover panel is opened to the position shown in FIG. 3, the flexible enclosure is opened also and this in turn moves the hoop braces to the erected position illustrated in FIG. 3, thus forming the erected enclosure.

Means are provided to support the cover panel in the horizontal cantilevered position shown in FIG. 3, said means taking the form of one or more cantilevered support members such as flexible cables 45 and it is preferable that at least two such cables be provided, one adjacent each end of the enclosure. The cables are secured by one end 46 thereof to hooks or rings 47 which, in turn, are secured adjacent the lower edge 30 of the enclosure, said hooks or rings being secured to the roof portion of the van. The cables then extend to each of the cross members 43 of at least subsidiary hoop braces sequentially, and are secured to these hoop braces by any conventional means such as clamps 48. The other ends 49 of the cables 45 are secured to hooks or rings 50 situated adjacent the end 32 of the enclosure where it is joined to adjacent the outer edge flange 18 of the cover panel. Adjusting turnbuckles 51 may be provided along the length of the cables in order to adjust the tension thereof and the length of these cables is such that when the enclosure is in the open position shown in FIG. 3, the cables support the cover panel in a horizontal position as illustrated.

As seen in FIG. 8, it should be noted that the portions of the cables extending between the innermost side hoop braces 35 and the adjacent hooks or rings 47 (defined as the inner securing portion of the cables) incline inwardly and downwardly towards one another (or towards the opposite end panel) due to the fact that the hooks or rings 47 are secured inboard of the end panels 28 of the enclosure when viewed in side elevation as shown in FIG. 8. This provides necessary side stability to the enclosure (parallel to the cross members of the hoops) when extended and reduces the possibility of endwise (i.e. end to end) movement and subsequent collapse of the enclosure.

Figures 5, 6, 7, 9:
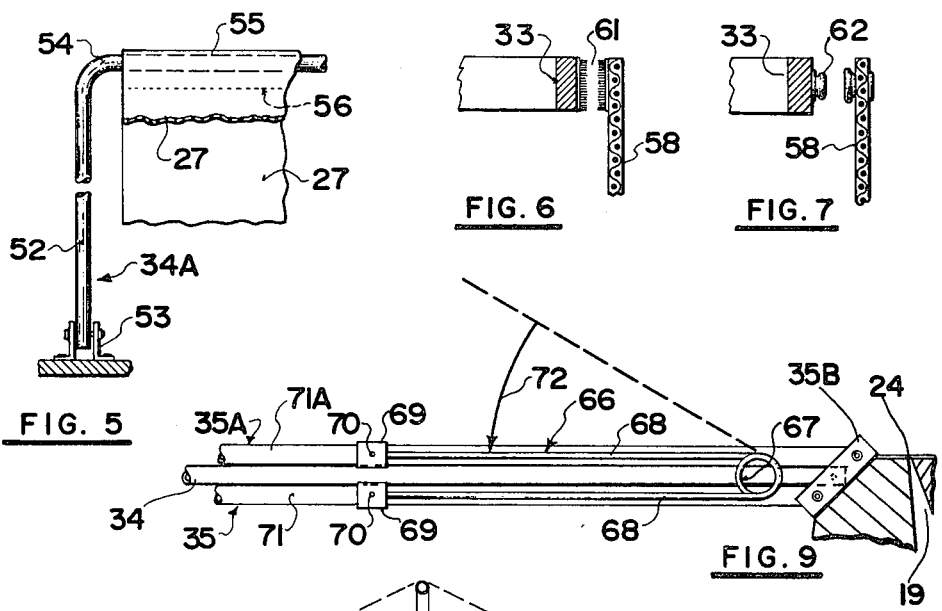
FIG. 5 is a fragmentary partially sectioned view showing an alternative attachment of the main hoop brace to the enclosure.
FIG. 6 is a fragmentary cross sectional view showing one method of attaching the screened porch.
FIG. 7 is a view similar to FIG. 6, but showing an alternative method.
FIG. 9 is a fragmentary end view of the subsidiary hoop braces of FIG. 4 in the closed position and with the torsion spring closed.

FIG. 5 shows an alternative embodiment in which the main hoop brace 34A is situated externally of the enclosure whereas all of the hoop braces shown in FIG. 3 are situated internally thereof. In this embodiment, the legs 52 are pivoted to brackets 53 secured to the roof panel and the cross member portion 54 of the main hoop brace 34A extends through a pocket 55 formed on the outside of the enclosure and at the apex 56 thereof.

When in the open position shown in FIG. 3, a flexible screened porch enclosure collectively designated 57 may be supported by the cover panel 16, said screened porch enclosure consisting of three sides of flexible fabric, two ends 58 and a front panel 59 with screened windows 60 being provided therein. The upper edges of the sides 58 and 59 may be secured to the outer edges of the flanges 33 and 18 either by means of fastening material such as "Velcro" (trade mark) 61 and shown in FIG. 6 or press studs 62 as shown in FIG. 7 or any other conventional form of detachable securement. The sides 58 and the front 59 hang downwardly and extend between the cover panel and the ground and, if necessary, a canvas skirt 64 may be secured such as by hooks and eyes 65, to along the lower edge of the side of the van and extend downwardly to the ground thus enclosing the space under the van body.

Access to the inside of the enclosure 26 is by means of the aperture 20 in the roof of the van and bedding may be provided upon the inside of the horizontally extending cover panel 16.

Figure 1:
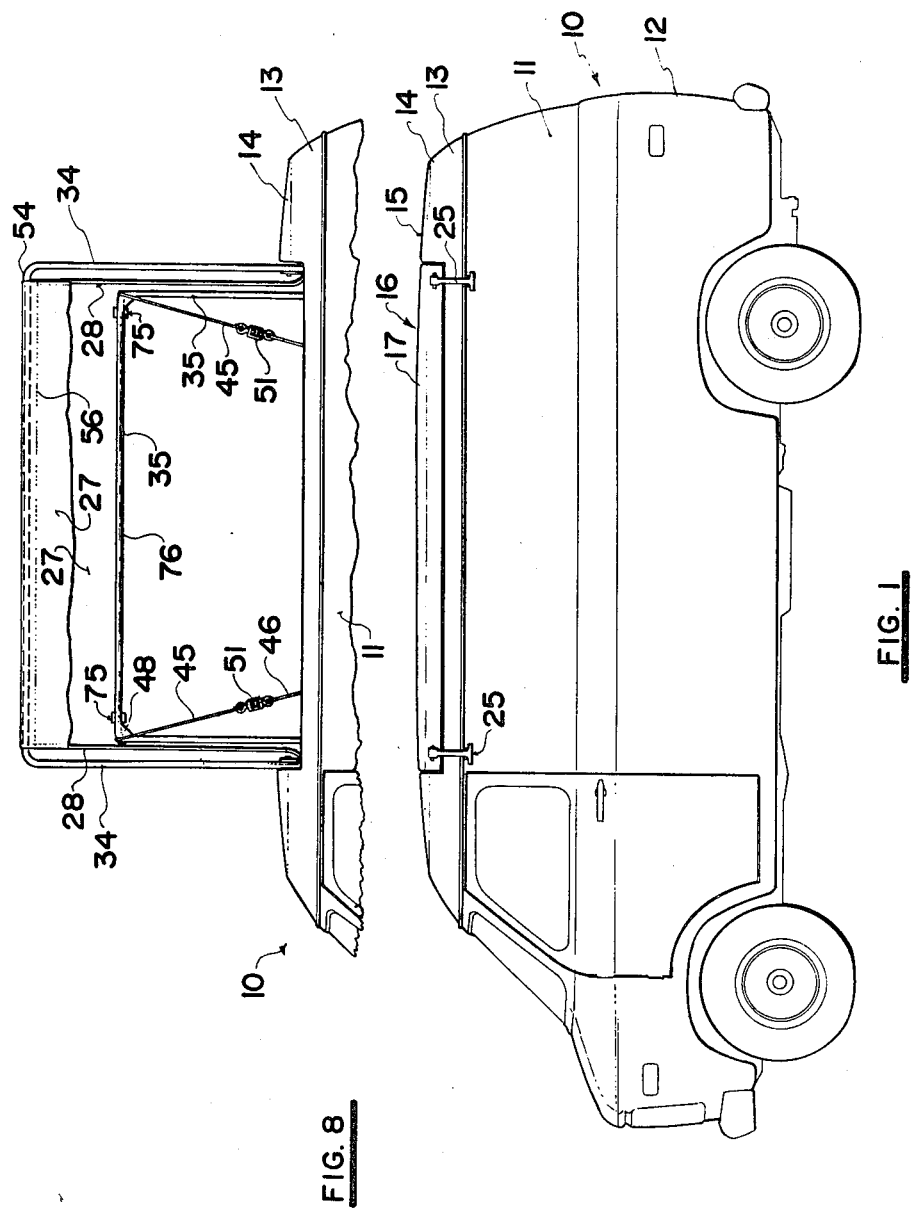
FIG. 1 is a side elevation of a van with the invention therein shown in the closed position.
Figure 2:
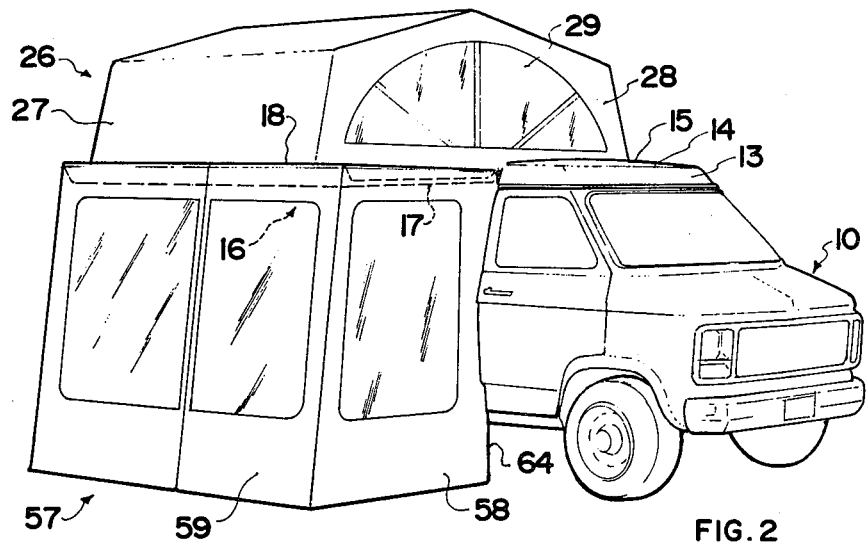
FIG. 2 is an isometric view of the van showing the enclosure in the open position and the screened porch erected.

When in the folded position, the hoop brace 34 is disengaged from the detents 42 and the cover panel is moved to the closed position shown in FIG. 1. The hoop braces 35 and 34 pivot in the direction of arrow 66 and the hoop brace 35A pivots in the direction of arrow 67. With the fabric of the enclosure between adjacent hoop braces concertinering between adjacent hoops and being stored in the vertical walls surrounding the aperture 20 and defined by flanges 18 and 33 of the cover panel 16 and flanges 21 and 23 of the opening edges. Latches 25 hold the cover panel in the closed position and sealing relationship with the top of the van.

FIGS. 4, 8, 9 and 10 show the preferred embodiment of the invention. A relatively heavy duty torsion spring component is provided collectively designated 66 which includes a loop spring portion 67 with a pair of legs 68 extending therefrom and terminating in blocks 69 which are in turn provided with a pivot or swiveling socket indicated by reference character 70 which in turn is attached one each to each leg 71 and 71A of the subsidiary hoop braces 35 and 35A respectively with the loop spring portion 67 being adjacent the distal ends 36 thereof and brackets 37.

The attachment of the swiveling sockets 70 may be by means of the pivot pins extending through the sockets and through the legs 71 and 71A respectively. It should also be noted that although one such spring component 66 is shown, it is preferable to have one such component at each end of the subsidiary hoop braces.

These torsion springs normally urge the subsidiary braces apart from one apart from one another through approximately an angle indicated by reference character 72 in FIG. 9.

Figure 4:
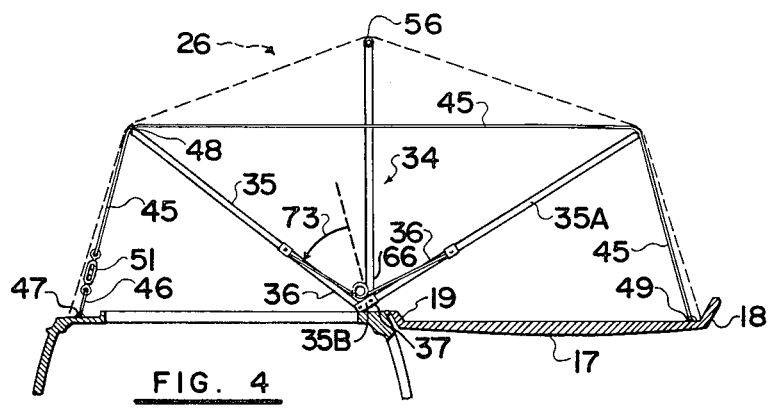
FIG. 4 is a fragmentary cross sectional view of the invention showing the cover panel support cables and also illustrating an alternative support structure.

However, when the cover panel is in the fully opened position as illustrated in FIG. 4, these torsion spring components are then in tension and are attempting to close the cover panel or draw the subsidiary hoops towards one another and the angular extension of the spring thus providing this closing action is illustrated by reference character 73 in FIG. 4.

It will therefore be seen that the springs not only act to assist in the opening of the cover panel, but also in the closing thereof.

Figure 10:
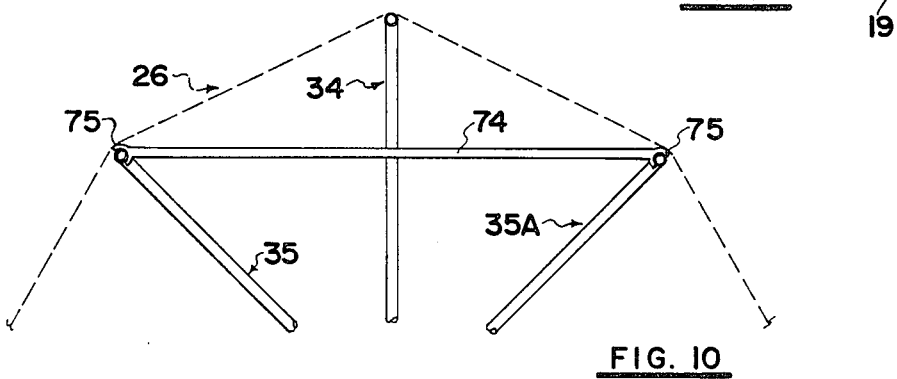
FIG. 10 is a partial end view similar to FIG. 4 and showing one of the detachably spreader bars in position.

It will therefore be appreciated that some means is required in order to hold the cover panel 16 in the fully opened position shown in FIGS. 8 and 4. Reference to FIG. 10 will show a spreader bar component 74 having U-shaped sockets 75 on each end thereof which are detachably engaged between the horizontal members or portions 43 of the subsidiary hoop braces 35, 35A, it being understood once again that there is preferably one such spreader bar adjacent each end of the horizontal portion 76. The U-shaped sockets are shown in end elevation in FIG. 8. FIG. 4 also shows an alternative mounting of the subsidiary hoops and the main hoop from that shown in FIG. 3, in that the subsidiary hoop braces 35, 35A are pivoted from a central block 35B secured to the flange adjacent the edge 12 and are lying substantially at the same pivot axis as the main hoop brace 34.

It will be appreciated that although the specification and drawings show the invention as installed upon a van 10, nevertheless it is readily applicable to truck campers, cars such as station wagons and the like.

It will also be appreciated that the cover panel 16 can be supported by detachable diagonal braces (not illustrated) extending between the adjacent side 11 of the van and the outer side of the cover panel 16.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a van or other vehicle which includes a body having sides, ends and a roof and having a substantially rectangular opening within said roof defined by a pair of spaced and parallel longitudinally extending edges and a pair of spaced and parallel transverse edges; the improvement comprising in combination a cover panel hinged by one side thereof to one side edge of the roof defining the opening therein and movable between a closed position covering the opening to an open position extending substantially horizontally from the one side edge of the roof and vice-versa, a flexible enclosure secured by the lower edges thereof to the other edges of the roof defining the opening and to the free sides of the cover panel, a plurality of substantially U-shaped hoop braces hinged by the ends thereof to the transverse edges defining the opening within the roof and to the transverse edges of the cover panel respectively, means to secure said enclosure to said hoops whereby, when said cover panel is opened, said hoops are erected by said enclosure, means to detachably latch said cover panel in the closed position and cantilever support structure supporting said cover panel in the open, horizontal position.

2. The improvement according to claim 1 in which said means to secure said enclosure to said hoops includes loop sleeves in said enclosure, said hoop braces are operatively engaging through said loop sleeves.

3. The improvement according to claim 1 in which said hoop braces include a main hoop brace and at least two subsidiary hoop braces, one upon each side of said main hoop brace, said main hoop brace being situated substantially vertically when said enclosure is erected, said subsidiary hoop braces including upwardly and outwardly upon each side of said main hoop brace.

4. The improvement according to claim 2 in which said hoop braces include a main hoop brace and at least two subsidiary hoop braces, one upon each side of said main hoop brace, said main hoop brace being situated substantially vertically when said enclosure is erected, said subsidiary hoop braces including upwardly and outwardly upon each side of said main hoop brace.

5. The improvement according to claim 3 in which said main hoop brace is situated externally of said enclosure, said subsidiary hoop braces being situated internally of said enclosure.

6. The improvement according to claim 4 in which said main hoop brace is situated externally of said enclosure, said subsidiary hoop braces being situated internally of said enclosure.

7. The improvement according to claim 3 in which said main hoop brace includes means to detachably secure same in an elevated relationship to said enclosure when said enclosure is in the erected position and to lock said hoop brace in said elevated position thereby tensioning said enclosure.

8. The improvement according to claim 4 in which said main hoop brace includes means to detachably secure same in an elevated relationship to said enclosure when said enclosure is in the erected position and to lock said hoop brace in said elevated position thereby tensioning said enclosure.

9. The improvement according to claim 7 in which said last mentioned means includes an aperture bracket adjacent the ends of said one longitudinal edge of said opening, the distal ends of said hoop brace being angulated and engaging through said brackets and a detent in said brackets spaced above the base thereof into which said ends engage when said main hoop brace is elevated vertically.

10. The improvement according to claim 8 in which said last mentioned means includes an aperture bracket adjacent the ends of said one longitudinal edge of said opening, the distal ends of said hoop brace being angulated and engaging through said brackets and a detent in said brackets spaced above the base thereof into which said ends engage when said main hoop brace is elevated vertically.

11. The improvement according to claim 1 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

12. The improvement according to claim 2 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

13. The improvement according to claim 3 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

14. The improvement according to claim 4 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

15. The improvement according to claim 5 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

16. The improvement according to claim 6 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

17. The improvement according to claim 7 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

18. The improvement according to claim 8 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

19. The improvement according to claim 9 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

20. The improvement according to claim 10 in which said cantilever support structure supporting said cover panel in the open position includes tension means including at least one flexible cable secured by one end thereof to the other longitudinal edge defining said opening, said cable extending to and being operatively secured to at least each of said U-shaped subsidiary hoop braces in sequence and being secured by the other end thereof to the distal edge of said cover panel.

21. The improvement according to claims 1, 2 or 3 in which said edges defining said opening extend substantially vertically from the plane of the roof, said cover panel including downwardly depending edges engaging said edges defining said opening, when in the closed position thereby defining a vertically sided enclosure, said flexible enclosure folding between said hoops and folding within said vertically sided enclosure when said cover panel is closed, and a flexible screened porch enclosure detachably secured to the free edges of said cover panel when opened horizontally and depending downwardly therefrom and extending from said cover panel to the ground surface, and means to detachably secure said flexible screened porch enclosure to said edges of said cover panel.

22. The improvement according to claims 4, 5 or 6 in which said edges defining said opening extend substantially vertically from the plane of the roof, said cover panel including downwardly depending edges engaging said edges defining said opening, when in the closed position thereby defining a vertically sided enclosure, said flexible enclosure folding between said hoops and folding within said vertically sided enclosure when said cover panel is closed, and a flexible screened porch enclosure detachably secured to the free edges of said cover panel when opened horizontally and depending downwardly therefrom and extending from said cover panel to the ground surface, and means to detachably secure said flexible screened porch enclosure to said edges of said cover panel.

23. The improvement according to claims 7, 8 or 9 in which said edges defining said opening extend substantially vertically from the plane of the roof, said cover panel including downwardly depending edges engaging said edges defining said opening, when in the closed position thereby defining a vertically sided enclosure, said flexible enclosure folding between said hoops and folding within said vertically sided enclosure when said cover panel is closed, and a flexible screened porch enclosure detachably secured to the free edges of said cover panel when opened horizontally and depending downwardly therefrom and extending from said cover panel to the ground surface, and means to detachably secure said flexible screened porch enclosure to said edges of said cover panel.

24. The improvement according to claims 10, 11 or 12 in which said edges defining said opening extend substantially vertically from the plane of the roof, said cover panel including downwardly depending edges engaging said edges defining said opening, when in the closed position thereby defining a vertically sided enclosure, said flexible enclosure folding between said hoops and folding within said vertically sided enclosure when said cover panel is closed, and a flexible screened porch enclosure detachably secured to the free edges of said cover panel when opened horizontally and depending downwardly therefrom and extending from said cover panel to the ground surface, and means to detachably secure said flexible screened porch enclosure to said edges of said cover panel.

25. The improvement according to claims 13, 14 or 15 in which said edges defining said opening extend substantially vertically from the plane of the roof, said cover panel including downwardly depending edges engaging said edges defining said opening, when in the closed position thereby defining a vertically sided enclosure, said flexible enclosure folding between said hoops and folding within said vertically sided enclosure when said cover panel is closed, and a flexible screened porch enclosure detachably secured to the free edges of said cover panel when opened horizontally and depending downwardly therefrom and extending from said cover panel to the ground surface, and means to detachably secure said flexible screened porch enclosure to said edges of said cover panel.

26. The improvement according to claims 16, 17 or 18 in which said edges defining said opening extend substantially vertically from the plane of the roof, said cover panel including downwardly depending edges engaging said edges defining said opening, when in the closed position thereby defining a vertically sided enclosure, said flexible enclosure folding between said hoops and folding within said vertically sided enclosure when said cover panel is closed, and a flexible screened porch enclosure detachably secured to the free edges of said cover panel when opened horizontally and depending downwardly therefrom and extending from said cover panel to the ground surface, and means to detachably secure said flexible screened porch enclosure to said edges of said cover panel.

27. The improvement according to claims 19 or 20 in which said edges defining said opening extend substantially vertically from the plane of the roof, said cover panel including downwardly depending edges engaging said edges defining said opening, when in the closed position thereby defining a vertically sided enclosure, said flexible enclosure folding between said hoops and folding within said vertically sided enclosure when said cover panel is closed, and a flexible screened porch enclosure detachably secured to the free edges of said cover panel when opened horizontally and depending downwardly therefrom and extending from said cover panel to the ground surface, and means to detachably secure said flexible screened porch enclosure to said edges of said cover panel.

28. The improvement according to claims 11, 12 or 13 in which said cable is secured by said one end thereof to said other longitudinal edge defining said opening at a point inboard of the ends of the enclosure whereby the inner securing portion of said cable inclines downwardly and inwardly towards said other longitudinal edge when said enclosure is opened thereby reducing endwise movement thereof when open.

29. The improvement according to claims 14, 15 or 16 in which said cable is secured by said one end thereof to said other longitudinal edge defining said opening at a point inboard of the ends of the enclosure whereby the inner securing portion of said cable inclines downwardly and inwardly towards said other longitudinal edge when said enclosure is opened thereby reducing endwise movement thereof.

30. The improvement according to claims 17, 18 or 19 in which said cable is secured by said one end thereof to said other longitudinal edge defining said opening at a point inboard of the ends of the enclosure whereby the inner securing portion of said cable inclines downwardly and inwardly towards said other longitudinal edge when said enclosure is opened thereby reducing endwise movement thereof when open.

31. The improvement according to claim 20 in which said cable is secured by said one end thereof to said other longitudinal edge defining said opening at a point inboard of the ends of the enclosure whereby the inner securing portion of said cable inclines downwardly and inwardly towards said other longitudinal edge when said enclosure is opened thereby reducing endwise movement thereof when open.

32. The improvement according to claims 3, 4 or 5 which includes a torsion spring component including a central portion and a leg portion extending from each side of said center portion, and operatively extending between said subsidiary hoop braces, and pivoted connecting means between the distal end of said leg portions and said subsidiary hoop braces, said torsion spring component normally urging said subsidiary hoop braces apart when said cover panel is in the closed position through a first portion of the arc travelled by said subsidiary hoop braces when moving towards the open position, and normally urging said subsidiary hoop braces towards one another through a first portion of the arc travelled by said subsidiary hoop braces when moving towards the closed position, and a spreader bar detachably engageable between said subsidiary hoop braces when said cover panel is in the open position, said spreader bar including a central rigid brace portion and subsidiary hoop brace engaging means on each end thereof.

33. The improvement according to claims 6, 7 or 8 which includes a torsion spring component including a central portion and a leg portion extending from each side of said center portion, and operatively extending between said subsidiary hoop braces, and pivoted connecting means between the distal end of said leg portions and said subsidiary hoop braces, said torsion spring component normally urging said subsidiary hoop braces apart when said cover panel is in the closed position through a first portion of the arc travelled by said subsidiary hoop braces when moving towards the open position, and normally urging said subsidiary hoop braces towards one another through a first portion of the arc travelled by said subsidiary hoop braces when moving towards the closed position, and a spreader bar detachably engageable between said subsidiary hoop braces when said cover panel is in the open position, said spreader bar including a central rigid brace portion and subsidiary hoop brace engaging means on each end thereof.

34. The improvement according to claims 9, 10 or 13 which includes a torsion spring component including a central portion and a leg portion extending from each side of said center portion, and operatively extending between said subsidiary hoop braces, and pivoted connecting means between the distal end of said leg portions and said subsidiary hoop braces, said torsion spring component normally urging said subsidiary hoop braces apart when said cover panel is in the closed position through a first portion of the arc travelled by said subsidiary hoop braces when moving towards the open position, and normally urging said subsidiary hoop braces towards one another through a first portion of the arc travelled by said subsidiary hoop braces when moving towards the closed position, and a spreader bar detachably engageable between said subsidiary hoop braces when said cover panel is in the open position, said spreader bar including a central rigid brace portion and subsidiary hoop brace engaging means on each end thereof.

35. The improvement according to claims 14, 15 or 16 which includes a torsion spring component including a central portion and a leg portion extending from each side of said center portion, and operatively extending between said subsidiary hoop braces, and pivoted connecting means between the distal end of said leg portions and said subsidiary hoop braces, said torsion spring component normally urging said subsidiary hoop braces apart when said cover panel is in the closed position through a first portion of the arc travelled by said subsidiary hoop braces when moving towards the open position, and normally urging said subsidiary hoop braces towards one another through a first portion of the arc travelled by said subsidiary hoop braces when moving towards the open position, and normally urging said subsidiary hoop braces towards one another through a first portion of the arc travelled by said subisidary hoop braces when moving towards the closed position, and a spreader bar detachably engageable between said subsidiary hoop braces when said cover panel is in the open position, said spreader bar including a central rigid brace portion and subsidiary hoop brace engaging means on each end thereof.

36. The improvement according to claims 17, 18 or 19 which includes a torsion spring component including a central portion and a leg portion extending from each side of said center portion, and operatively extending between said subsidiary hoop braces, and pivoted connecting means between the distal end of said leg portions and said subsidiary hoop braces, said torsion spring component normally urging said subsidiary hoop braces apart when said cover panel is in the closed position through a first portion of the arc travelled by said subsidiary hoop braces when moving towards the open position, and normally urging said subsidiary hoop braces towards one another through a first portion of the arc travelled by said subsidiary hoop braces when moving towards the open position, and normally urging said subsidiary hoop braces towards one another through a first portion of the arc travelled by said subsidiary hoop braces when moving towards the closed position, and a spreader bar detachably engageable between said subsidiary hoop braces when said cover panel is in the open position, said spreader bar including a central rigid brace portion and subsidiary hoop brace engaging means on each end thereof.

37. The improvement according to claims 20 or 31 which includes a torsion spring component including a central portion and a leg portion extending from each side of said center portion, and operatively extending between said subsidiary hoop braces, and pivoted connecting means between the distal end of said leg portions and said subsidiary hoop braces, said torsion spring component normally urging said subsidiary hoop braces apart when said cover panel is in the closed position through a first portion of the arc travelled by said subsidiary hoop braces when moving towards the open position, and normally urging said subsidiary hoop braces towards one another through a first portion of the arc travelled by said subsidiary hoop braces when moving towards the open position, and normally urging said subsidiary hoop braces towards one another through a first portion of the arc travelled by said subsidiary hoop braces when moving towards the closed position, and a spreader bar detachably engageable between said subsidiary hoop braces when said cover panel is in the open position, said spreader bar including a central rigid brace portion and subsidiary hoop brace engaging means on each end thereof.

38. The improvement according to claims 1 or 2 which includes a torsion spring component including a central portion and a leg portion extending from each side of said center portion, and operatively extending between said subsidiary hoop braces, and pivoted connecting means between the distal end of said leg portions and said subsidiary hoop braces, said torsion spring component normally urging said subsidiary hoop braces apart when said cover panel is in the closed position through a first portion of the arc travelled by said subsidiary hoop braces when moving towards the open position, and normally urging said subsidiary hoop braces towards one another through a first portion of the arc travelled by said subsidiary hoop braces when moving towards the closed position, and a spreader bar detachably engageable between said subsidiary hoop braces when said cover panel is in the open position, said spreader bar including a central rigid brace portion and subsidiary hoop brace engaging means on each end thereof.

* * * * *